US009439246B2

(12) United States Patent
Paull

(10) Patent No.: US 9,439,246 B2
(45) Date of Patent: Sep. 6, 2016

(54) DYNAMIC POWER BALANCING AMONG MULTIPLE INDUCTION HEATER POWER UNITS

(71) Applicant: Ameritherm, Inc., Scottsville, NY (US)

(72) Inventor: Ian Alan Paull, Henrietta, NY (US)

(73) Assignee: Ambrell Corporation, Scottsville, NY (US)

( * ) Notice: Subject to any disclaimer, the term of this patent is extended or adjusted under 35 U.S.C. 154(b) by 358 days.

(21) Appl. No.: 14/218,313

(22) Filed: Mar. 18, 2014

(65) Prior Publication Data

US 2014/0319128 A1 Oct. 30, 2014

Related U.S. Application Data

(60) Provisional application No. 61/788,101, filed on Mar. 15, 2013.

(51) Int. Cl.

| | |
|---|---|
| ***H05B 6/06*** | (2006.01) |
| ***H05B 6/04*** | (2006.01) |
| ***H02M 7/00*** | (2006.01) |
| ***H02J 1/04*** | (2006.01) |

(52) U.S. Cl.

CPC .................................... *H05B 6/065* (2013.01)

(58) Field of Classification Search

CPC .... H05B 6/065; H02J 5/005; Y10T 307/696; Y10T 307/391

USPC ....... 219/660, 661, 662, 664, 667, 628, 633, 219/480, 481, 489, 492; 363/71, 96, 65, 363/148; 373/149, 147, 80, 102, 148; 307/64, 43, 52, 71, 82

See application file for complete search history.

(56) References Cited

U.S. PATENT DOCUMENTS

| | | | | |
|---|---|---|---|---|
| 6,163,019 A * | 12/2000 | Green | H02M 7/53873 | 219/660 |
| 2012/0248098 A1* | 10/2012 | Lee | H05B 6/065 | 219/660 |
| 2013/0015705 A1* | 1/2013 | Abe | H02J 5/005 | 307/29 |

* cited by examiner

*Primary Examiner* — Quang Van

(74) *Attorney, Agent, or Firm* — Rothwell, Figg, Ernst & Manbeck, P.C.

(57) ABSTRACT

A modular RF power system allows multiple power supplies to combine their RF output power as a single system and deliver it to a common resonant circuit. For flexibility and commonality, each power supply is designed to be separately powered by AC line voltage (aka AC Mains). The AC voltage supplied to each power supply may differ due to differing AC distribution line length, line impedance, wire gauge, or different supply generation locations.

1 Claim, 5 Drawing Sheets

DYNAMIC POWER BALANCING AMONG MULTIPLE INDUCTION HEATER POWER UNITS

CROSS-REFERENCE TO RELATED APPLICATIONS

This application claims the benefit of provisional patent application No. 61/788,101, filed on Mar. 15, 2013 (this application is being timely filed within the one-year period as Mar. 15, 2014 fell on a Saturday and, on Mar. 17, 2014, the U.S. Patent and Trademark Office was closed due to a snow emergency in the Washington, DC area). The above identified provisional application is incorporated by reference in its entirety.

TECHNICAL FIELD

This disclosure relates to power balancing among power supplies, and, more specifically, it relates to power balancing among multiple (two or more) induction heater power units.

BACKGROUND

Induction heating generally refers to the process of heating an object (usually a metal object) by exposing the object to a time-varying magnetic field and, thereby, inducing a current (e.g., an eddy current) in the object. The induced current creates heat. To create the time-varying magnetic field, an induction heating unit is used. An induction heating unit typically includes the following components: (1) a power unit for producing a radio frequency (RF) signal and (2) a load comprising a coil coupled to the power unit for receiving the RF signal and producing the time-varying magnetic field. The power unit may include: a rectifier (a.k.a., AC/DC converter) for converting alternating current (AC) to direct current (DC) and an inverter for converting the DC produced by the rectifier to an RF signal, thereby producing the RF signal provided to the coil.

In some applications it would be advantageous to couple the coil to multiple power units so that the coil receives an RF signal from the multiple power units. However, in such a system where the coil receives power from multiple power units, there is a need to ensure that the power units operate in unison.

SUMMARY

In one aspect there is provided a modular power supply system, which includes multiple power supply modules, for providing power to a common load. In some embodiments, the modular power supply system includes: a drive signal generator that generates a common PWM drive signal; a first power supply module configured to receive power from a first AC power supply source, the first power supply module comprising: (i) a first AC/DC converter for converting AC power to DC power, (ii) a first PWM control signal generator configured to generate a first PWM control signal, and (iii) a first switching system comprising a first set of switches and a second set of switches, wherein the switching system is configured to (a) receive the DC power, the common PWM drive signal and the first PWM control signal and (b) cycle the switches based on the common PWM drive signal and the first PWM control signal, thereby producing a first output signal for driving the common load; a first monitor for monitoring the output power or temperature of the first power supply module; a second power supply module configured to receive power from a second AC power supply source that is different than the first AC power supply source, the second power supply module comprising: (i) a second AC/DC converter for converting AC power to DC power, (ii) a second PWM control signal generator configured to generate a second PWM control signal, and (iii) a second switching system comprising a first set of switches and a second set of switches, wherein the switching system is configured to (a) receive the DC power, the common PWM drive signal and the second PWM control signal and (b) cycle the switches based on the common PWM drive signal and the second PWM control signal, thereby producing a second output signal for driving the common load; a second monitor for monitoring the output power or temperature of the second power supply module; and a master controller coupled to the first and second monitors, wherein the master controller is configured to (a) cause the first PWM control signal generator to modify the duty cycle of the first PWM control signal in response to the output power or temperature of the first power supply module exceeding a threshold and (b) cause the second PWM control signal generator to modify the duty cycle of the second PWM control signal in response to the output power or temperature of the second power supply module exceeding a threshold.

The modular system allow multiple power supply modules to combine their output power (usually RF output power) as a single system and deliver the combined power to the object to be heated using a common resonant circuit. The object to be heated and the common resonant circuit form the common load of the power system.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments.

DETAILED DESCRIPTION

Figure 1:
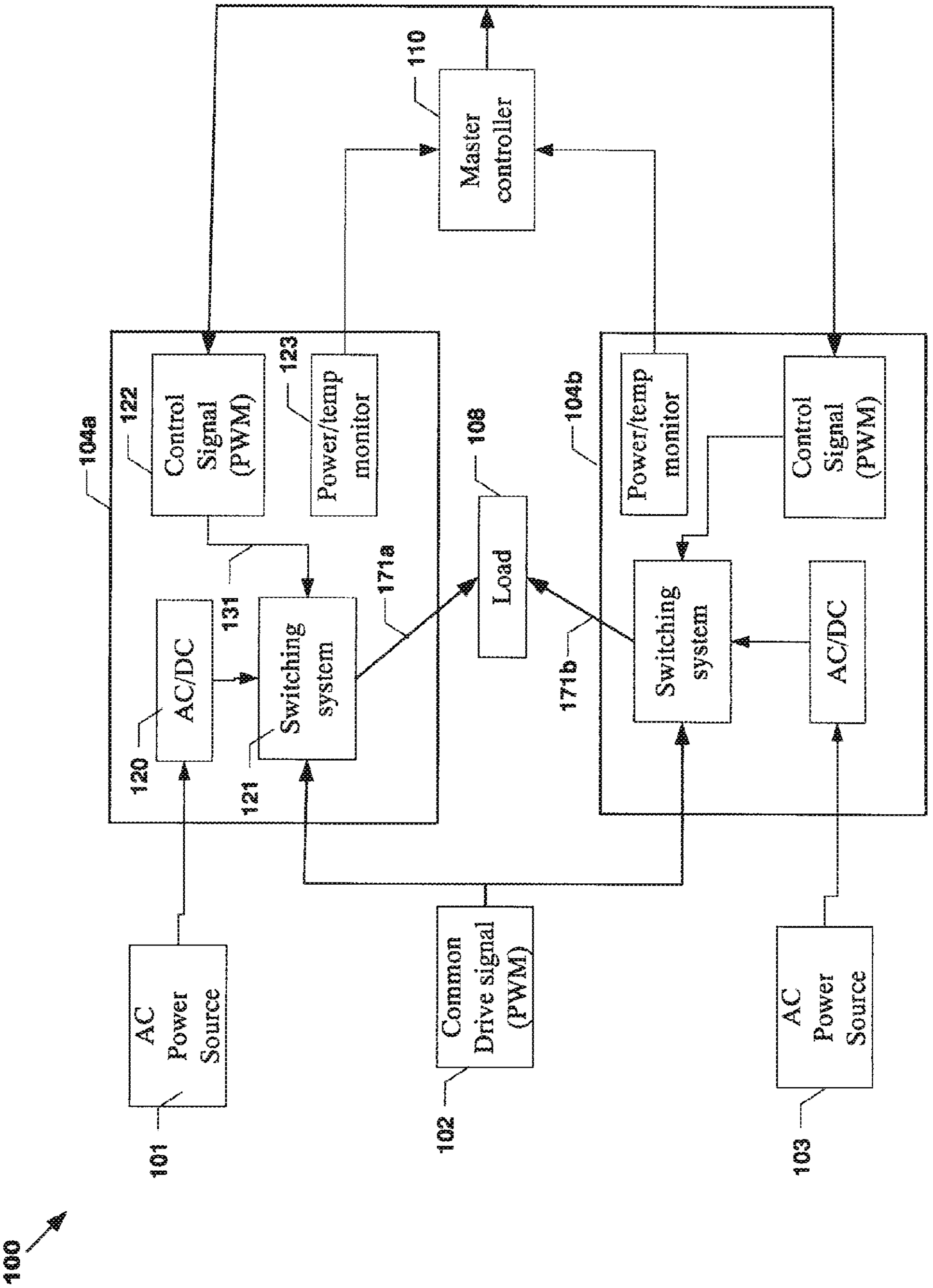
FIG. 1 illustrates a system according to some embodiments.

FIG. 1 illustrates a modular power supply system 100 according to some embodiments. As shown in FIG. 1, in some embodiments, system 100 includes a first power supply module 104*a* and a second power supply module 104*b* for driving a common load 108. That is, load 108, which may include a coil, is coupled to the output of module 104*a* and the output of module 104*b*. That is, load 108 receives drive signals 171 and 172 output by modules 104*a* and 104*b*, respectively. In the embodiment shown, system 100 also includes a drive signal generator 102 that generates a common PWM drive signal 190 that is received by the modules of system 100. Only two modules 104 are shown in FIG. 1 for the sake of brevity and explanation, however, system 100 may have more than two modules 104 that drive the common load 108.

The first power supply module 104*a* is configured to receive power from a first AC power supply source 101 and the second power supply module 104*b* is configured to receive power from a second AC power supply source 103. Hence, each module 104 of system 100 may be separately powered by AC line voltage (a.k.a., AC mains). The AC signal (e.g. AC voltage) supplied to each module 104 may differ due to one or more of: differing AC distribution line length, line impedance, wire gauge, and different supply generation locations.

For maximum system efficiency, each power supply module 104 should deliver its power at precisely the same (resonant) frequency, in phase with every power supply connected to the common load. For maximum utilization, each power supply module 104 should deliver the same percent of rated power.

Accordingly, as shown in FIG. 1, in some embodiments, system 100 includes a drive signal generator that generates a common drive signal 190 so that each power supply will output a drive signal that has substantially the same frequency and phase. That is, drive signal 171 should have at least substantially the same frequency as drive signal 172 and the two signals 171 and 172 should at least be substantially in phase. In some embodiments, common drive signal 190 is an RF signal having a square-wave waveform and is pulse width modulated. That is, the width of the pulses of the square-wave is modulated to, for example, increase or decrease the power delivered by system 100 to load 108.

As further shown in FIG. 1, each power supply module may include: (i) an AC/DC converter 120 for converting the AC power output by source 101 to DC power; (ii) a pulse width modulation (PWM) control signal generator 122 configured to generate a PWM control signal 131, which may have a square-wave waveform; and (iii) a switching system 121, which functions as an inverter, wherein the switching system 121 is configured to (a) receive the DC power, the common drive signal 190 and the PWM control signal 122 and (b) produce an output signal 171 for driving the common load 108, wherein the form of the output signal is based on the common drive signal 190 and control signal 122; and (iv) a monitor 123 for monitoring one or more of: the output power, temperature, etc. of the power supply module 104.

As further shown in FIG. 1, system 100 includes a master controller 110 controller coupled to the monitors 123 of the modules 104. In some embodiments, the master controller 110 is configured, such that, in response to receiving from a monitor 123 of a module 104 information indicating that the output power of the module 104 (and/or the temperate of the module 104) is exceeding a predetermined threshold, the master controller causes the PWM control signal generator 122 of the module 104 to modify a duty cycle of the PWM control signal 131 produced by the generator 122. By modifying the duty cycle of control signal 131, controller 110 can, at least to some degree, control the output signal 171 that is produced by switching system. For example, as further explained herein, modifying the duty cycle of control signal 131 has the effect of causing cycles to be dropped from signal 171.

Figure 2:
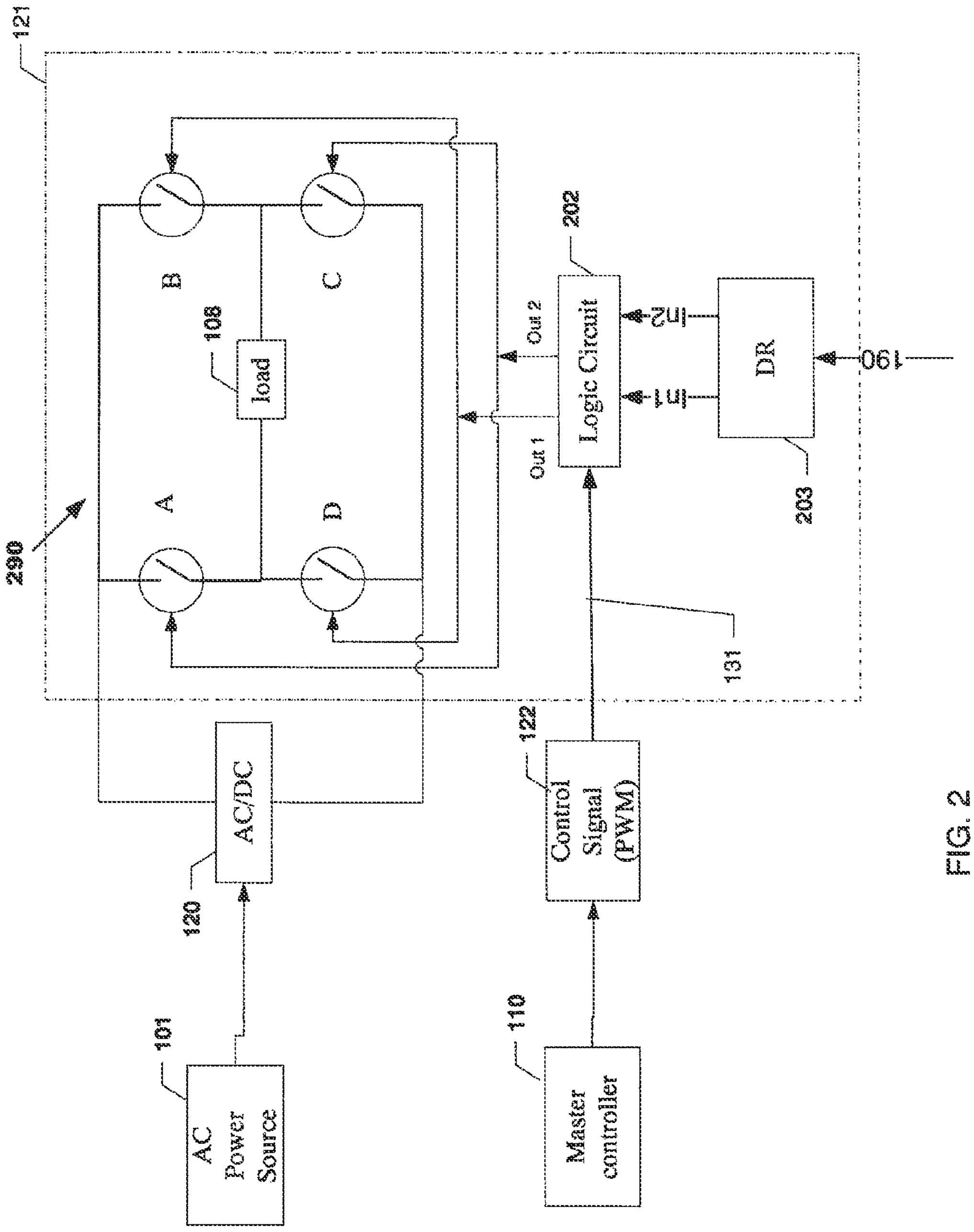
FIG. 2 illustrates a switching system according to some embodiments.

Referring now to FIG. 2, FIG. 2 illustrates switching system 121 according to some embodiments. As shown in FIG. 2, switching system 121, in some embodiments, includes: power module bridge circuit 290 comprising switches (A-D) configured in a full-bridge configuration; a differential receiver (DR) 203; and a logic circuit 202 that outputs a first drive signal (out1) for operating switches B and D and a second drive signal (out2) for operating switches A and C. Switches A-D may be MOSFET transistors or other transistors. As illustrated, DR 203 receives the common drive signal 190, which may be a differential signal (i.e., signal 190 may comprise two complimentary signals), and generates single ended signals in1 and in2. As also shown in FIG. 2, logic circuit 202 receives as input the control signal 131, signal in1 and signal in2.

Figure 3:
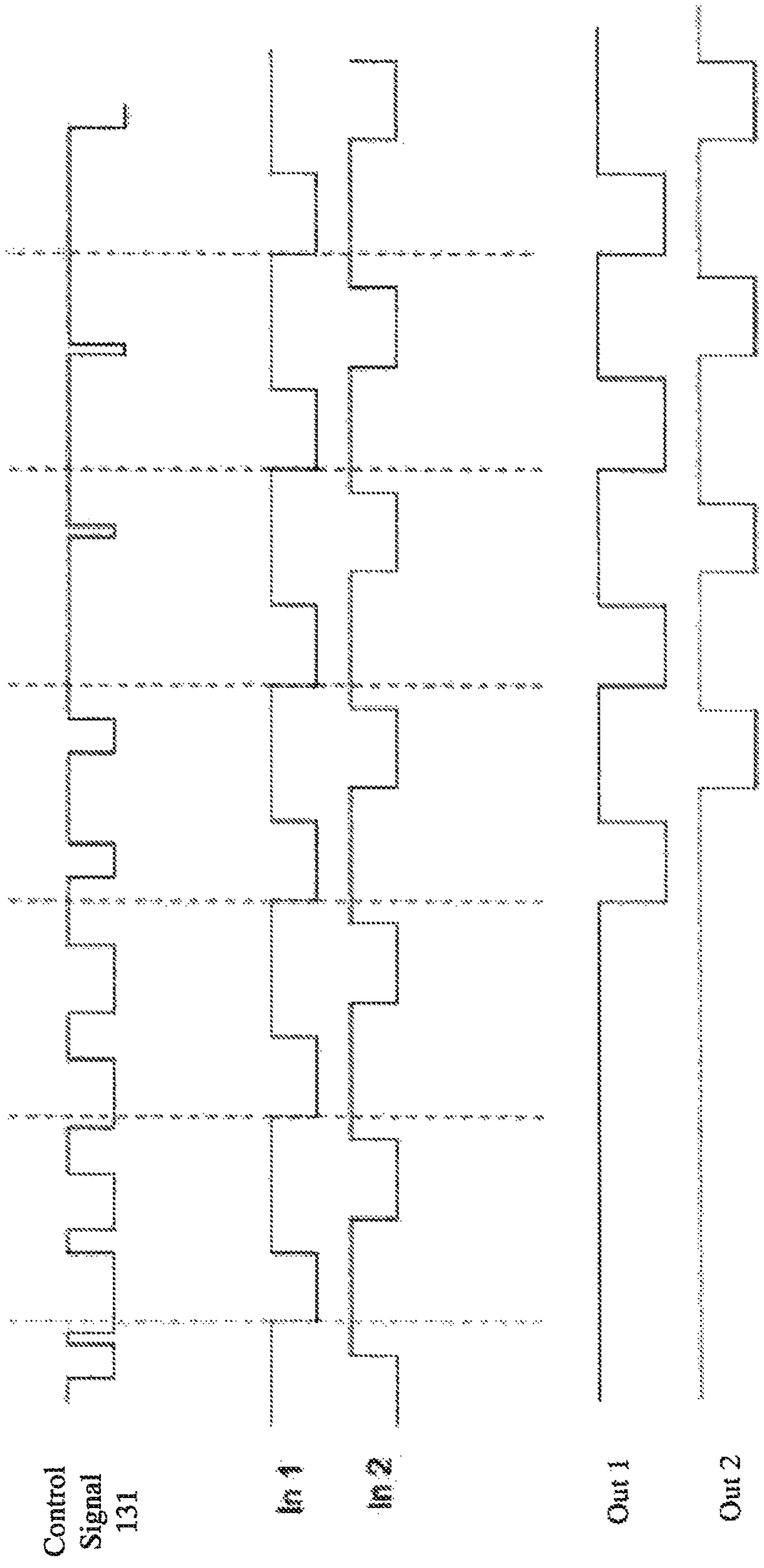
FIG. 3 illustrates the relationship between outputs (out1 and out2) and inputs (signal 131, in1, and in2) of a logic circuit 102 according to some embodiments.

Referring now to FIG. 3, FIG. 3 illustrates the relationship between the outputs (out1 and out2) and the inputs (signal 131, in1, and in2) of logic circuit 102 according to one embodiment. As shown in the embodiment of FIG. 3, out1 is normally in the HIGH state, but out1 will transition to the LOW state whenever in1 transitions to the LOW state provided that control signal 131 is in the HIGH state at the time that in1 transitions to the LOW state. Additionally, when out1 is in the LOW state, out1 will transition to the HIGH state whenever ml transitions to the HIGH state, regardless of the state of the control signal 131. Similarly, out2 is normally in the HIGH state, but out2 will transition to the LOW state whenever in2 transitions to the LOW state provided that control signal 131 is in the HIGH state at the time that in1 transitions to the LOW state. Additionally, when out2 is in the LOW state, out2 will transition to the HIGH state whenever in2 transitions to the HIGH state, regardless of the state of the control signal 131.

Figure 4:
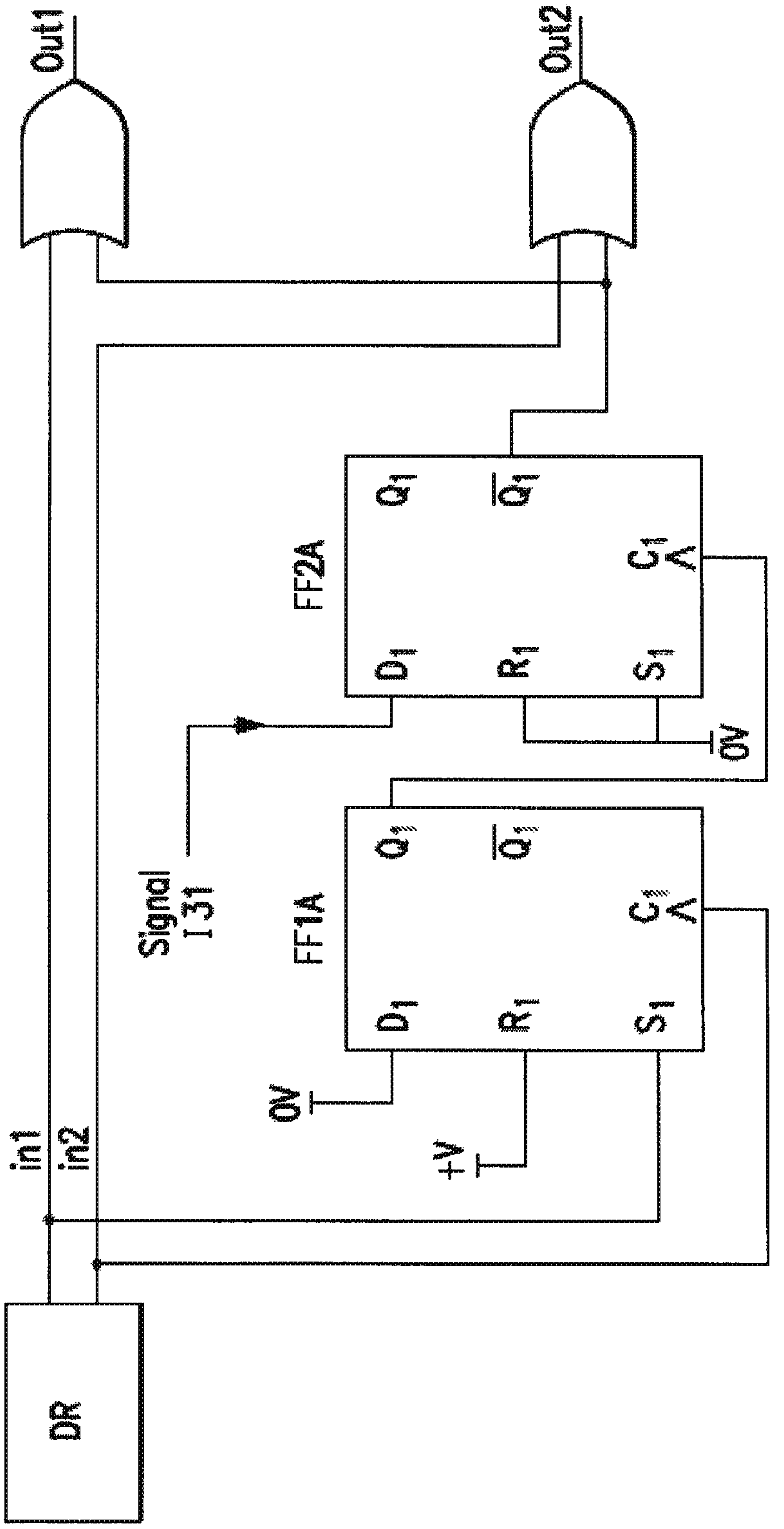
FIG. 4 illustrates a logic circuit according to some embodiments.
Figure 5:
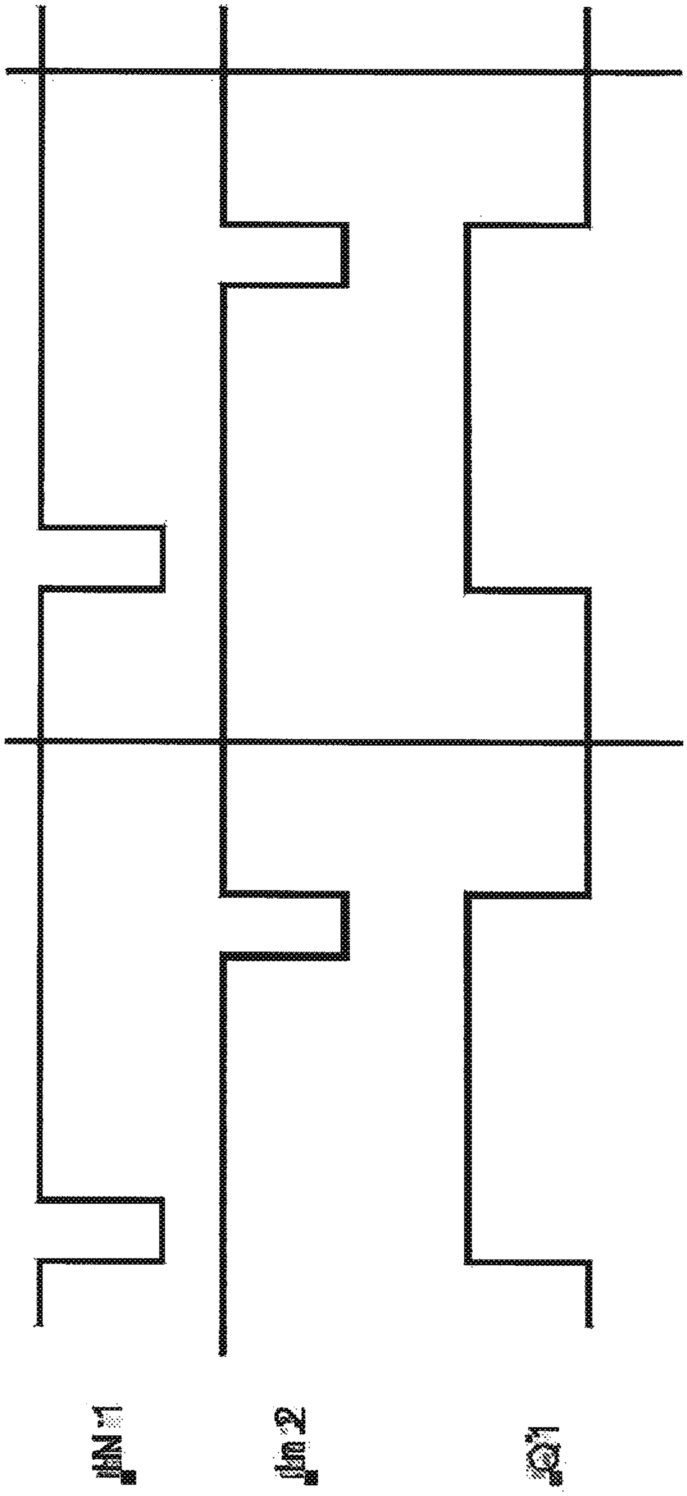
FIG. 5 illustrates various signals.

Referring now to FIG. 4, FIG. 4 is a circuit diagram showing one possible implementation of logic circuit 202. As shown, DR 203 receives differential drive signals 190 and generates single ended signals: In1 and In2 at the operating frequency. The combined cycle of In1 and In2 comprise one full drive cycle to be presented to the power module bridge circuit 290. Two full cycles of these signals are shown in FIG. 5. They are active LOW and in this example they are presented at a 10% duty cycle. Their duty cycle is used to regulate the resultant output level. This type of regulation is referred to as Pulse Width Modulation (PWM). Very low duty cycles result in a very low output level, while a nearly 50% duty (of each) result in maximum output level. In the embodiment shown, In1 and In2 are 180 degrees out of phase.

These two signals are presented to FF1A with In1 driving the (−)SET Input and In2 driving the CLOCK input. Resultant FFIA (Q1) waveform is actively HIGH from the time In1 becomes active until the time In2 becomes inactive—thereby framing the active time of each cycle.

This framing waveform is presented to FF2A CLOCK input. FF2A (−)Q1 is determined by the level of the control signal 131 at the rising edge of the framing signal and it determines whether In1 and In2 will be either be allowed to reach the power module bridge 290 (signal 131 is high at the rising edge of Framing input) or whether these two signals are inhibited (signal 131 is low at the rising edge of the Framing input). Over a long period of time with respect to the operating frequency, the resultant power switching waveform output from circuit 290 reflects the desired amount of enabled cycles.

This technique inhibits some number of drive signals over time without changing the PWM duration of the drive signals or their operating frequency. It is able to vary the number of cycles that are inhibited over a very wide range: from inhibiting all of them, resulting in no output; to inhibiting none of them, resulting on no impact to the desired output.

An advantage of this design is that cycles are inhibited asynchronously as the controlling signal 131 is asynchronous with the operating frequency. Inhibit cycles are usually very short as the controlling signal 131 generally runs at a higher frequency than the operating frequency. Inhibited cycles are also rarely contiguous (i.e. are spread out), resulting in very little resultant output ripple and plenty of signal for sensing even at low duty drive signals.

Additional Advantages:

Designing the system to accommodate independently AC powered power units provides additional benefits as users seek to minimize THID (Transient Harmonic Current Distortion) on the AC distribution network.

As higher power systems naturally draw more current from the AC distribution network, AC current distortion (especially from nonlinear rectifier circuitry) become more troublesome, interfering with other powered units.

A common practice to minimize THID is to separate the supplied AC power among units and introduce a phase shift to the AC power to each power supply. This approach minimizes the ability of each unit's distortion to fully combine. Phase shifting the AC power not only reduces the combining effect of the units producing distortion, but if implemented correctly, can cancel the largest contributors.

Theoretically, the more points of correct phase shift that are employed, the more distortion harmonics that can be canceled. However, the theoretical advantage is never truly enjoyed as it relies on perfect balancing of the AC Mains' phases and the voltage balance among the supplies it is addressing. Alternative measures used such as harmonic phase balancing to improve the end result are costly.

An advantage of internally balancing the output power of each power supply is that it makes the AC mains appear to be balanced. The result is that traditional, less costly phase shift techniques employed can approach theoretical capabilities even with unbalanced AC lines.

While various embodiments have been described above, it should be understood that they have been presented by way of example only, and not limitation. Thus, the breadth and scope of the present invention should not be limited by any of the above-described exemplary embodiments. Moreover, any combination of the above- described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A modular power supply system for providing power to a common load, comprising:

a drive signal generator that generates a common drive signal;

a first RF power supply module configured to receive power from a first AC power supply source, the first RF power supply module comprising: (i) a first AC/DC converter for converting AC power to DC power, (ii) a first control signal generator configured to generate a first control signal, and (iii) a first switching system comprising a first set of switches and a second set of switches, wherein the switching system is configured to (a) receive the DC power, the common drive signal and the first control signal and (b) cycle the switches based on the common drive signal and the first control signal, thereby producing a first output signal for driving the common load;

a first monitor for monitoring the output power or temperature of the first power supply module;

a second RF power supply module configured to receive power from a second AC power supply source that is different than the first AC power supply source, the second RF power supply module comprising: (i) a second AC/DC converter for converting AC power to DC power, (ii) a second control signal generator configured to generate a second control signal, and (iii) a second switching system comprising a first set of switches and a second set of switches, wherein the switching system is configured to (a) receive the DC power, the common drive signal and the second control signal and (b) cycle the switches based on the common drive signal and the second control signal, thereby producing a second output signal for driving the common load;

a second monitor for monitoring the output power or temperature of the second power supply module; and a master controller coupled to the first and second monitors, wherein the master controller is configured to (a) cause the first control signal generator to modify the duty cycle of the first control signal in response to the output power or temperature of the first power supply module exceeding a threshold and (b) cause the second control signal generator to modify the duty cycle of the second control signal in response to the output power or temperature of the second power supply module exceeding a threshold.

* * * * *